United States Patent [19]

Johnson

[11] 3,984,161
[45] Oct. 5, 1976

[54] MOBILE COMMUNICATION CONSOLE

[76] Inventor: Frederick M. Johnson, P.O. Box 102, South Weymouth, Mass. 02190

[22] Filed: Jan. 28, 1975

[21] Appl. No.: 544,689

[52] U.S. Cl. .......................... 312/7 R; 224/42.42 R; 224/42.45 R; 312/254
[51] Int. Cl.² ............................................ B60R 7/04
[58] Field of Search .......................... 312/7 R, 254; 224/42.42 A, 42.42 R, 42.45 R, 42.45 B; 296/37 R

[56] References Cited
UNITED STATES PATENTS

| | | | |
|---|---|---|---|
| 3,279,872 | 10/1966 | Howke | 224/29 R |
| 3,405,944 | 10/1968 | Krechman | 224/42.11 |
| 3,471,029 | 10/1969 | Dolan | 312/7 R |
| 3,550,001 | 12/1970 | Hanley | 224/42.42 R |
| 3,589,577 | 6/1971 | Basinger | 224/42.42 R |
| 3,632,158 | 1/1972 | Boothe | 296/37 R |
| 3,658,219 | 4/1972 | Van Ordt | 224/42.42 R |
| 3,685,708 | 8/1972 | Herrington | 224/42.45 R |
| 3,827,772 | 8/1974 | Johnson | 248/13 |

Primary Examiner—Paul R. Gilliam
Assistant Examiner—Alex Grosz
Attorney, Agent, or Firm—Weingarten, Maxham & Schurgin

[57] ABSTRACT

A modular mobile communication console for two-way radio equipment used in vehicles such as automobiles, buses, trucks, boats, among others. The console provides theft-proof mounting adjacent the driver for communication equipment including controls, speakers, microphones and walkie-talkies and auxiliary items such as portable lights and switches for other equipment. The modular concept for mounting pieces of equipment to the console provides for installation convenience and for easy access to the equipment within the console for repair or replacement.

17 Claims, 4 Drawing Figures

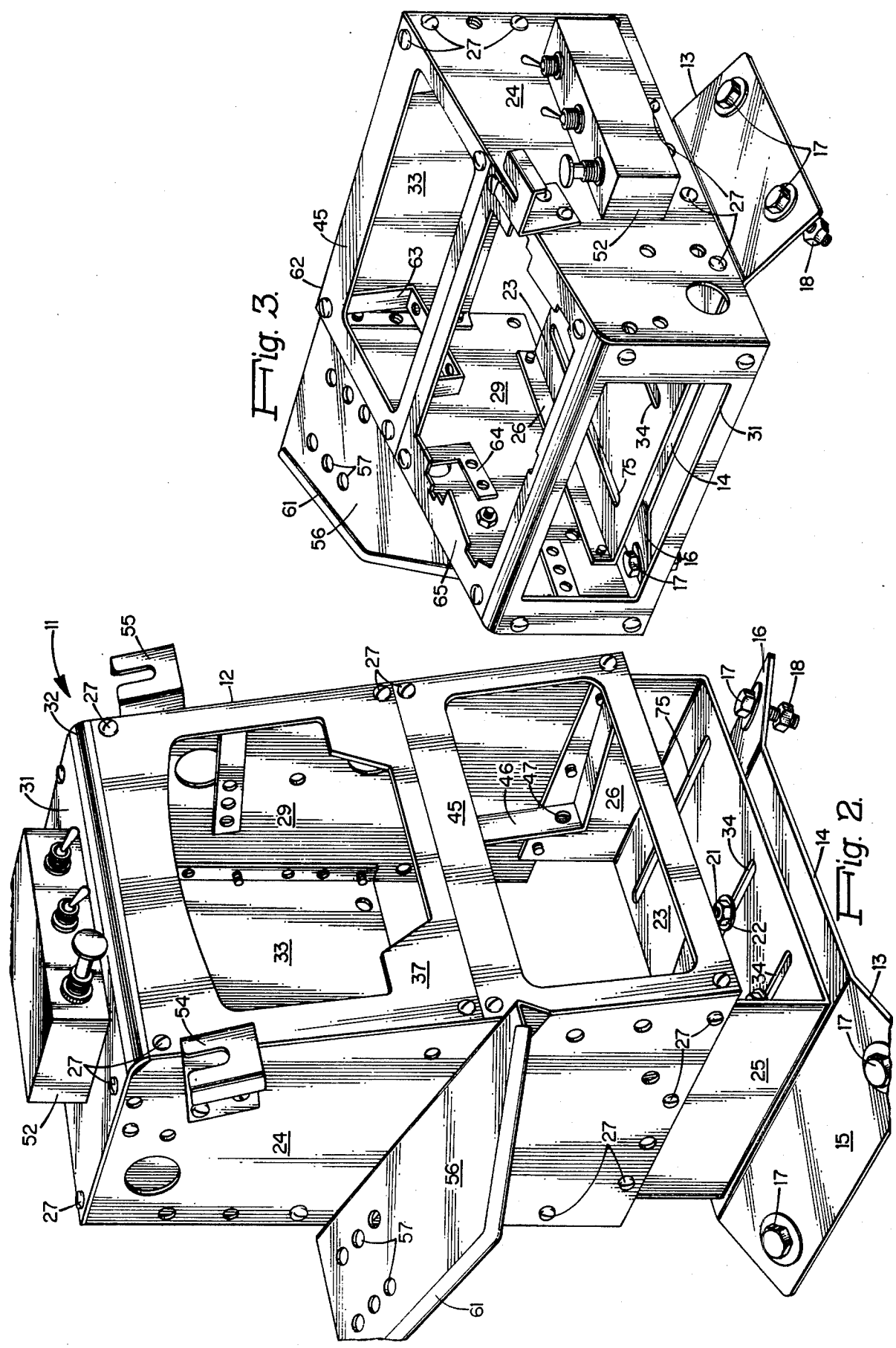

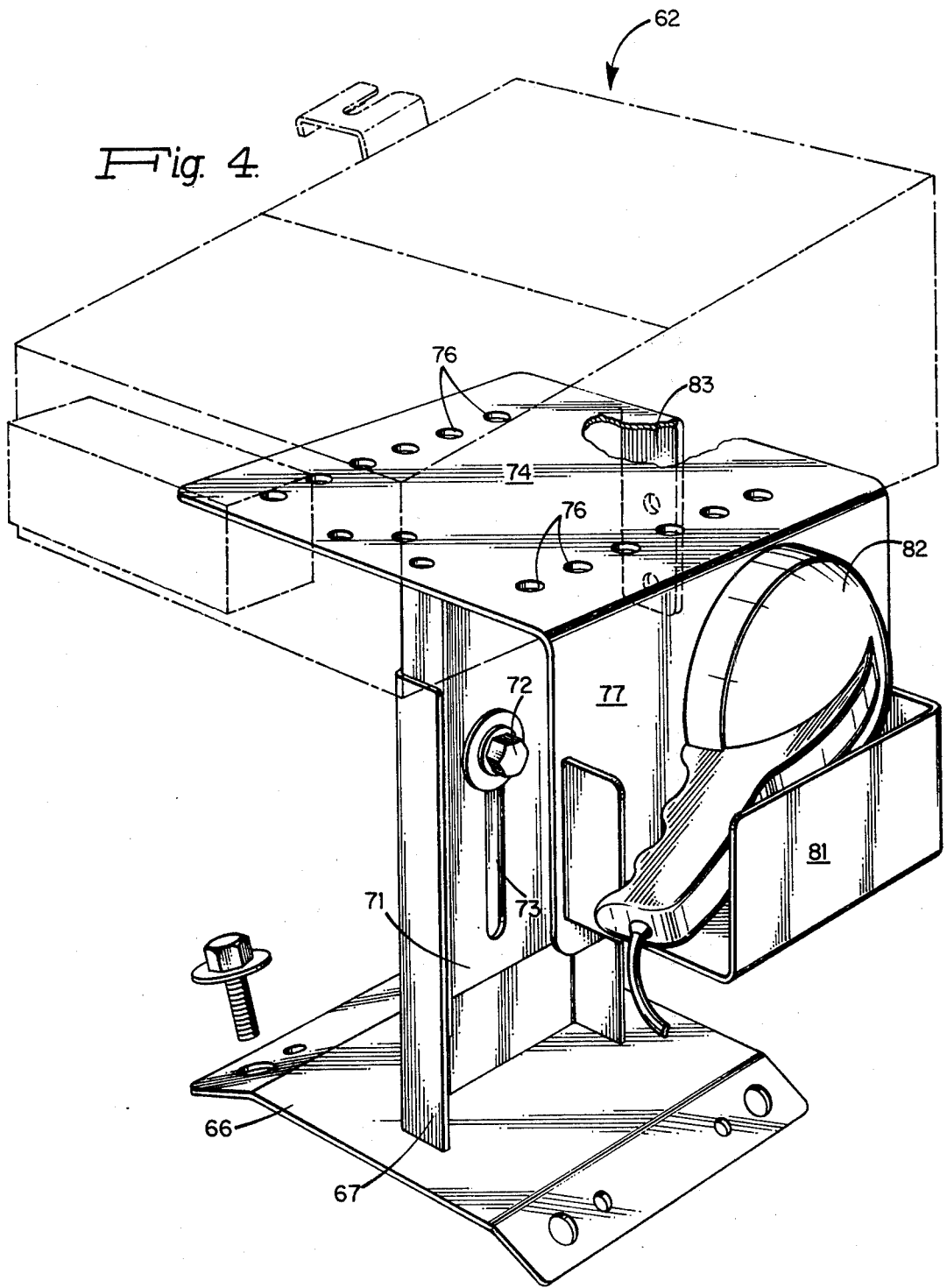

MOBILE COMMUNICATION CONSOLE

FIELD OF THE INVENTION

This invention relates in general to communication equipment and more specifically concerns a two-way modular radio communication console for mobile use.

DISCUSSION OF THE PRIOR ART

It has generally been necessary, when a mobile unit such as an automobile is equipped with a significant amount of two-way radio equipment, that much of the equipment be mounted in various areas in the vicinity of the dashboard. This is especially true of police vehicles. With such equipment mounted to and under the dash in different positions, it has been subject to poor accessibility, theft, incidental damage and could cause injury to the occupants of the vehicle.

The most pertinent prior art is disclosed in U.S. Pat. No. 3,827,772 issued to the present inventor. The invention disclosed herein is an improvement over the invention of the above-mentioned patent.

SUMMARY OF THE INVENTION

This invention provides an improved modular communication console for mobile units such as police cars. The console is adaptable to radios of any relatively standard configuration and also includes mounting brackets for microphones, handsets, lanterns and controls for external equipment such as sirens and lights. The invention is configured so that the basic housing may be mounted to the mobile unit and the radios later inserted and mounted to the housing as modular units thereby completing the console. This facilitates mounting of the housing to the mobile unit at the dealer's shop while the radios and other equipment may be mounted by the user; in the case of police cars, at the police garage.

In the preferred embodiment the base plate is mounted to the central drive shaft hump of an automobile and the housing is mounted to the base plate. A particular feature of this invention provides means for the housing to be mounted either in a vertical or a horizontal orientation to the base plate with substantially all of the same structural elements being used. Theft-resistant means are used for securing the console within an automobile and for securing the communication equipment within the console. The console may be longitudinally adjustable fore and aft so that it may be mounted in a position to suit the driver.

An alternative embodiment is disclosed for use in vans or other twin seat type vehicles. This embodiment includes a pedestal which adjustably raises the console above the base plate to a desired height. Furthermore, this embodiment may be used in any automobile where the particular preference of the operator is to have the unit at a higher level.

It should be noted that this console is suitable for any mobile use including boats and land-based vehicles.

BRIEF DESCRIPTION OF THE DRAWING

The advantages, features and objects of this invention will be more clearly understood from the following detailed description when taken in conjunction with the drawing in which:

FIG. 2 is a perspective view of the console of FIG. 1 without the radio equipment;

FIG. 3 is a perspective view of the console of the present invention mounted in a horizontal orientation; and FIG. 4 shows a pedestal for mounting or raising the console above the base plate.

DESCRIPTION OF THE PREFERRED EMBODIMENTS

Figure 1:
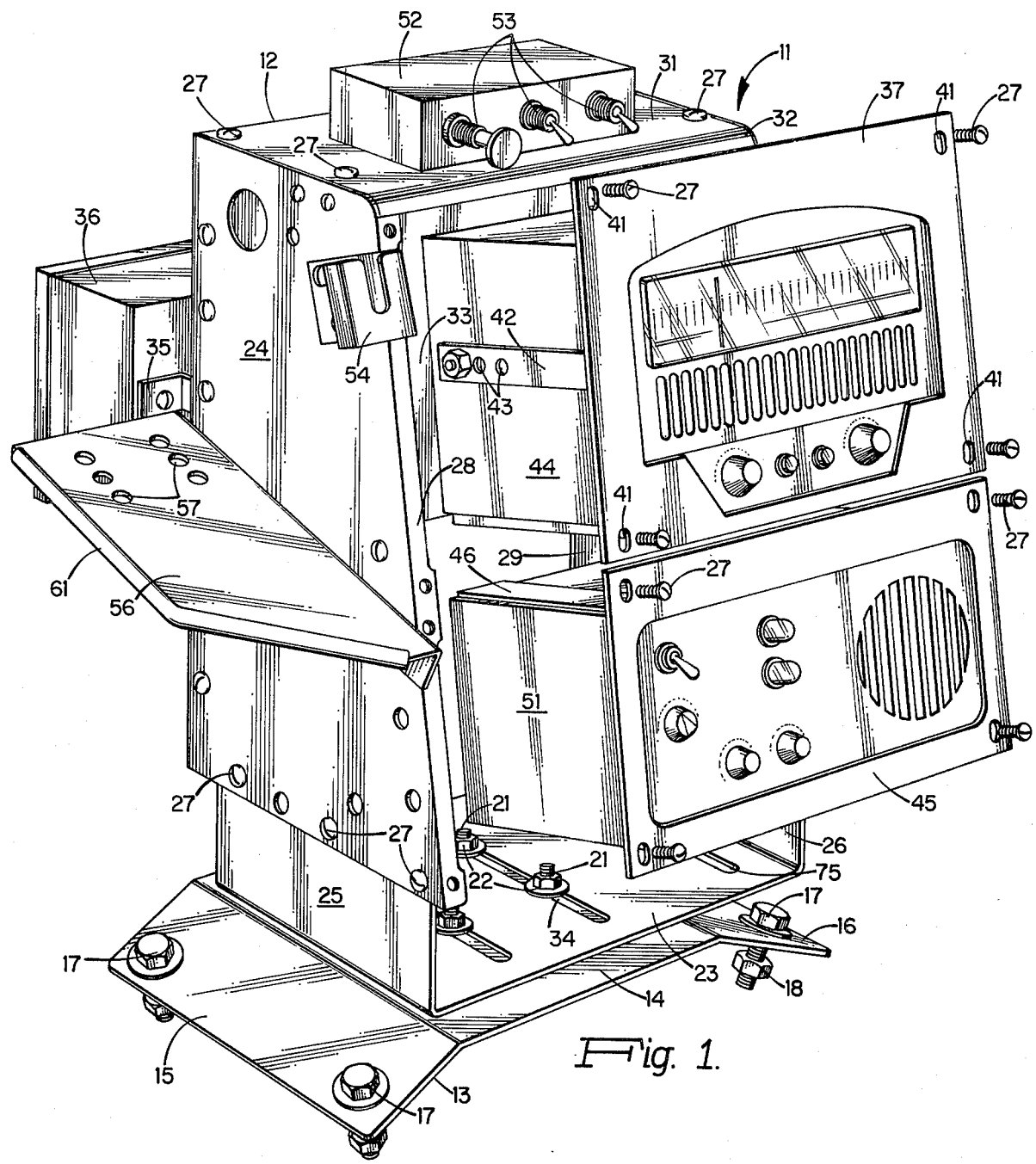
FIG. 1 is a partially exploded perspective view of a modular communication console constructed in accordance with this invention mounted in vertical orientation, showing typical radio equipment mounted thereto.

With reference now to the drawing, and more particularly to FIGS. 1 and 2 thereof, there is shown a communication console 11 comprised of a housing 12 secured to base plate 13. The base plate has a flat portion 14 and flanges 15 and 16 integral therewith and bent at an angle with respect to the flat portion. Flanges 15 and 16 may be bent to any angle so as to fit the drive shaft hump of the particular automobile to which it is to be mounted. It should be noted that base plate 13 may be flat to be secured to a flat floor, or it may have any desired configuration to accommodate whatever surface to which it is to be attached. Bolts 17 are preferably welded to flanges 15 and 16 and project downwardly therefrom so that nuts 18 may be secured to the bolts from beneath the automobile. Bolts 21 are welded to flat portion 14 of base plate 13 and project upwardly therefrom to receive nuts 22 securing U-shaped bracket 23 to the base plate. It may be appreciated from this particular construction that the base plate and U-shaped brackets are mounted in such a way that when the entire console is mounted to the automobile, it is relatively theft-resistant. Housing side members 24 and 29 are substantially identical but are mirror images of one another and are mounted to upright flanges 25 and 26 respectively of U-shaped bracket 23 by means of anti-theft screws 27. Different holes may be formed in the side members as desired but the basic configuration of the sides are the same. Similar anti-theft screws are used throughout the console for securing the various elements thereof together. End panel 31 is secured to both sides 24 and 29 and has a rounded edge 32 extending a short way down the rearward facing edges of the side members. The housing 12 is completed by front panel 33 secured between side members 24 and 29 at the forward edges thereof. U-shaped bracket 23 may be formed with slots 34 through which bolts 21 extend to provide for fore and aft adjustment of the position of the housing with respect to the base plate if desired.

Front panel 33 is provided with a bracket 35 extending outwardly or forwardly therefrom to which a speaker 36 may be mounted. Such speaker would normally be mounted closely adjacent the panel 33 but as shown in FIG. 1 it is separated therefrom for expository purposes. Upper rear panel or bezel 37 is configured with slightly elongated or oval holes 41 at the corners thereof through which screws 27 extend to secure the bezel to rear flanges 28 of side members 24 and 29 by means of threaded holes therein. Elongated holes 41 are provided to allow for manufacturing tolerances. Mounted to bezel 37 and extending forwardly or inwardly therefrom is bracket or strap 42 having holes 43 therethrough to provide means for securing radio 44 to the bezel. It should be appreciated that the bezel with bracket 42 mounted hereto may be coupled to the radio at any time and mounted to housing 12 after it has been secured to an automobile. Similarly, lower rear panel or bezel 45 is provided with a pair of inwardly extending U-shaped brackets or straps 46 having mounting holes 47 therein for securing communication component 51 to the bezel. This unit is also modular and can be mounted to the housing after it has been secured to the automobile.

Control box 52 mounted to end panel 31 includes controls and switches 53 for purposes of operation of the roof light, siren or spotlight, for example. If desired, end panel 31 could be configured as an additional bezel to which a piece of communication equipment could be mounted, and control box 52 mounted to a free side of the housing as shown in FIG. 3. Microphone clips 54 and 55 are mounted to either side of the housing and provide convenient means for hanging microphones to the console when not in use. Bracket 56 is shown mounted to side element 24 to provide a convenient location for a telephone receiver or handset. This bracket could be located on either side of the housing and several mounting holes 57 are provided for flexibility in mounting the receiver cradle to the bracket. Lengths of channel rubber or plastic 61 may be mounted to the edges of bracket 56 for protection of the occupants. Any other edges of the console or elements attached thereto may likewise be protected.

It may be noted that a substantial portion of the forward facing side of the housing remains open and several relatively large holes are provided through the sides 24 and 29 of the housing. These openings and holes provide for cooling of the radio equipment as well as access for cords and cables to connect the equipment to external devices such as power sources and the equipment being controlled such as the roof light. Other holes may be provided as desired for securing brackets or equipment to the console. Speaker bracket 35 may have any desired configuration or orientation so that the speaker may face forwardly or to either side or a second similar bracket may be provided so that two speakers may be used. Straps 42 and 46 mounted to bezels 37 and 45 respectively may have any desired shape or configuration as necessary to mount the radio to them. Further, the bezels may be configured as necessary to accommodate a particular piece of communication equipment.

Housing 62 shown in FIG. 3 uses substantially identical elements as those which comprise housing 12 shown in FIGS. 1 and 2. Side panels 24 and 29, end panel 31 and control box 52 are all assembled in the same manner, except that panel 24 is now the right side and panel 29 is the left side. End panel 31 is shown as a bezel and control box 52 is mounted to side panel 24 to show a possible alternative, but it could have been the same as the housing shown in FIG. 1. Handset bracket 56 is mounted to different holes in side panel 29 so that its orientation with respect to base plate 13 is similar to that shown in FIGS. 1 and 2. Front panel 33 of FIG. 1 is the same as front panel 33 of FIG. 3 but it is mounted to the short edges of side panel 24 and 29 opposite end panel 31 while U-shaped bracket 23 is mounted to the long edges of the side panels. Upright flanges 25 and 26 of U-shaped bracket 23 are shown in FIG. 1 as longer than the equivalent upright flanges of bracket 23 shown in FIG. 3. However, the brackets could well be identically configured in either embodiment. U-shaped strap 63 mounted to bezel 45 is substantially the same as strap 46 of FIG. 1, while mounting bracket 64 secured to bezel 65 is shaped differently from bracket 42 mounted to bezel 37 of FIG. 1. As stated previously, the shape of the brackets by which the radios are mounted to the bezels is not important and is somewhat dictated by the manner in which the radio must be mounted to the bezel. It should also be noted that while front panel 33 of FIG. 3 may be identical to front panel 33 of FIG. 1, it may be somewhat narrower if desired.

The alternative embodiment shown in FIG. 4 is for purposes of raising the console above the base plate which is mounted to the floor of the mobile unit. In this embodiment, base plate 66 has channel member 67 welded thereto and projecting upwardly therefrom. The base plate is secured to the vehicle floor in the manner previously described for base plate 13. A similar channel member 71 configured to fit within channel member 67 is slidably secured thereto by means of bolt 72 in slot 73. Mounting plate 74 is secured to channel member 71 and its height is adjustable. The housing 62 of FIG. 3 may be mounted to flat plate 74 employing outside slots 34 and 75 in U-shaped bracket 23 as shown in FIGS. 1 and 2 by means of bolts extending through any of holes 76 in plate 74. If required, plate 74 may also include a downwardly extending flange 77 to which may be mounted a bracket 81 for holding a power light 82, a battle lantern or other equipment as desired. Furthermore, a speaker could be mounted to downwardly projecting flange 77 or it could alternatively be mounted to downwardly projecting strap 83 secured to the forward facing edge of plate 74. In panel type vehicles there may be no drive shaft hump, in which case base plate 66 would be flat. All of the other features of the invention as previously specified apply equally to this embodiment.

Note that the two slots 34 in U-shaped bracket 23 are closer together than are adjacent slots 34 and 75. In FIGS. 1 and 2 the console is mounted to base plate 13 so as to overhang to the right. It is apparent that bracket 23 could be reversed if desired so that the console would overhang to the left as shown in FIG. 3.

In view of the above description, it is likely that modifications and improvements will occur to those skilled in the art which are within the scope of this invention.

What is claimed is:

1. A modular mobile communication console comprising:
 a base plate having a concave side adapted to accommodate the drive shaft hump of an automobile;
 a housing for enclosing communication equipment therein, said housing comprising:
  a U-shaped mounting bracket with at least two parallel slots formed therein, said U-shaped mounting bracket forming the bottom of said housing;
  first and second substantially flat similar side members in confronting, spaced, face-to-face, substantially parallel relationship, each having a first long peripheral edge, a first short peripheral edge perpendicular to said first long edge at one end thereof, a second short peripheral edge parallel to and longer than said first short edge at the other end of said first long edge, and a second long peripheral edge between said first and second short edges opposite said first long edge, each said side member forming a quadralateral, said U-shaped mounting bracket being secured to and extending substantially perpendicularly between said second short edges of said first and second side members;

an end panel secured to and extending substantially perpendicularly between said first short edges of said first and second side members;

a front panel secured to and extending substantially perpendicularly between said first long edges of said first and second side members;

an upper substantially planar bezel removably secured to and extending substantially perpendicularly between said second long edges of said first and second side members, said upper bezel having an opening therethrough;

brackets secured to said upper bezel adjacent said opening, said brackets extending inwardly into said housing and being adapted for mounting a piece of communication equipment within said housing to said upper bezel, the front of said communication equipment being visible and accessible through said opening;

a lower substantially planar bezel removably secured to and extending substantially perpendicularly between said second long edges of said first and second side members closely adjacent said upper bezel, said lower bezel having an opening therethrough;

brackets secured to said lower bezel adjacent said opening, said brackets extending inwardly into said housing and being adapted for mounting a piece of communication equipment within said housing to said lower bezel, the front of said communication equipment being visible and accessible through said opening, whereby the communication equipment and said upper and lower bezels are each unitarily removable for replacement or repair of the respective communication equipment mounted thereto; and a plurality of bolts mounted to said base plate and extending upwardly therefrom projecting through said slots in said U-shaped mounting bracket for securing said housing to said base plate.

2. A modular mobile communication console comprising:

a housing for enclosing communication equipment therein, said housing comprising:

first and second substantially flat similar side members in confronting, spaced, face-to-face, substantially parallel relationship, each having first, second, third and fourth peripheral edges forming a quadralateral;

a U-shaped mounting bracket forming the bottom of said housing, said bracket being secured to and extending substantially perpendicularly between one of said third and fourth peripheral edges of said first and second side members;

an end panel secured to and extending substantially perpendicularly between said first peripheral edges of said side members;

a front panel secured to and extending substantially perpendicularly between the other of said peripheral third and fourth edges of said side members and covering at least a portion of the opening between said side members;

at least one substantially planar bezel removably secured to and extending substantially perpendicularly between said second peripheral edges of said side members, said bezel having an opening therethrough and brackets secured thereto adjacent said opening, said brackets extending inwardly into said housing and being adapted for securing a piece of communication equipment within said housing to said bezel, the front of said communication equipment being visible and accessible through said opening, said communication equipment and said bezel being unitarily removable for replacement or repair of said communication equipment mounted within said housing; and means mounted to said U-shaped mounting bracket for securing said housing to the floor fo a mobile unit, said housing being oriented vertically with said bezel opening facing rearwardly when said U-shaped bracket and said front panel are respectively secured between said fourth and third peripheral edges of said side members, and being oriented horizontally with said bezel opening facing upwardly when said U-shaped bracket and said front panel are respectively secured between said third and fourth peripheral edges of said side members.

3. The communication console recited in claim 1 and further comprising a forwardly extending bracket secured to said housing adapted for mounting a speaker thereto.

4. The communication console recited in claim 1 wherein:

said front panel is secured between said third edges of said side members; and said U-shaped mounting bracket is secured between said fourth edges of said side members;

said housing being oriented in an upright position with respect to the floor of the mobile unit.

5. The communication console recited in claim 1 wherein:

said front panel is secured to said fourth edges of said side members; and said U-shaped mounting bracket is secured between said third edges of said side members;

whereby said housing is oriented horizontally with respect to the floor of the mobile unit.

6. The communication console recited in claim 1 and further comprising a telephone handset bracket secured to one side member and projecting outwardly therefrom.

7. The communication console recited in claim 6 and further comprising at least one microphone hanger secured to one of said side members and projecting outwardly therefrom.

8. The communication console recited in claim 2 and further comprising:

a base plate having a concave side adapted to accommodate the floor contours of the mobile unit;

said means for securing said housing to the mobile unit comprising theft-resistant bolts coupling said U-shaped mounting bracket to said base plate.

9. The communication console recited in claim 8 wherein said U-shaped mounting bracket is formed with at least two parallel slots therethrough for adjustably securing said mounting bracket to said base plate.

10. The communication console recited in claim 9 wherein said two parallel slots are located off-center of the main bottom portion of said U-shaped mounting bracket, said U-shaped mounting bracket being adaptable to be mounted between said side members with said slots oriented toward the left side or toward the right side of said console, thereby permitting said console to be mounted to said base plate in a manner to be offset to the left or to the right with respect thereto.

11. The communication console recited in claim 2 wherein said means for securing said housing to the mobile unit comprises:
- a base plate adapted for mounting to the floor of the mobile unit;
- a first upright channel member secured to said base plate;
- a second upright channel member mounted for longitudinally adjustable movement to said first upright channel member; and
- a mounting plate secured to said second upright channel member, said housing being secured to said mounting plate.

12. The communication console recited in claim 11 and further comprising a bracket mounted to the forward facing edge of said mounting plate adpated for mounting a speaker thereto.

13. The communication console recited in claim 11 and further comprising:
- a downwardly projecting flange secured to one side edge of said mounting plate; and
- a bracket secured to said flange adpated for retaining a lantern therein.

14. The communication console recited in claim 2 and further comprising:
- a second substantially planar bezel removably secured to and extending substantially perpendicularly between said first and second side members at said second edges thereof closely adjacent said one bezel, said second bezel having an opening therethrough and inwardly extending brackets secured thereto adapted for securing a piece of communication equipment to said second bezel, said communication equipment and said second bezel being unitarily removable for replacement or repair of said communication equipment.

15. The communication console recited in claim 12 wherein a substantial portion of the area of said end panel is removed to form a third bezel, said end panel having inwardly extending brackets secured thereto and adapted for securing a piece of communication equipment to said end panel, said communication equipment and said end panel being unitarily removable for replacement or repair of said communication equipment secured thereto.

16. The communication console recited in claim 14 wherein said first and fourth edges of said side members are relatively short compared with said second and third edges, said fourth edge being longer than said first edge, said second edge thereby being at an angle with respect to said third edge.

17. The communication console recited in claim 16 wherein:
- the corners of said side members at the junction of said first and second edge are rounded;
- the surface of said end panel adjacent one edge thereof being bent to conform to said rounded corners of said side members and extend along said second edges for a short distance;
- said rounded portion of said end panel, said one bezel and said second bezel being in abutting relationship and substantially extending throughout the entire length of said second edge of said side members.

* * * * *